US012750144B2

(12) United States Patent
Silverman et al.

(10) Patent No.: US 12,750,144 B2
(45) Date of Patent: Sep. 29, 2026

(54) ACCESS POINT WITH ADJUSTABLE SCAN RADIO

(71) Applicant: Cisco Technology, Inc., San Jose, CA (US)

(72) Inventors: Matthew A. Silverman, Shaker Heights, OH (US); Santosh B. Kulkarni, Sunnyvale, CA (US); Ashish Pasha Sheikh, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 511 days.

(21) Appl. No.: 18/344,171

(22) Filed: Jun. 29, 2023

(65) Prior Publication Data

US 2025/0007631 A1 Jan. 2, 2025

(51) Int. Cl.
*H04B 17/327* (2015.01)
*H04B 17/382* (2015.01)

(52) U.S. Cl.
CPC ......... *H04B 17/327* (2015.01); *H04B 17/382* (2015.01)

(58) Field of Classification Search
CPC .... H04B 17/25; H04B 17/318; H04B 17/327; H04B 17/382; H04W 52/245; H04W 84/12; H04W 88/08
See application file for complete search history.

(56) References Cited

U.S. PATENT DOCUMENTS 10,028,156 B2 7/2018 Homchaudhuri et al.
2016/0373984 A1 12/2016 Hara
2017/0063484 A1* 3/2017 Naghshvar ........... H04B 17/318
2017/0272319 A1 9/2017 Sheen et al.
2018/0176792 A1 6/2018 Egner et al.
2019/0116512 A1 4/2019 Terry et al.
2021/0204224 A1 7/2021 Kumar et al.
2021/0243623 A1 8/2021 Bodiga et al.
2021/0400618 A1* 12/2021 Smith ................. G01S 5/02955

OTHER PUBLICATIONS

International Search Report and Written Opinion for International Application No. PCT/US2024/033308, mailed Oct. 7, 2024, 14 Pages.
Joel Brand, "Self-Interference Cancellation for Co-Located TDD Radios Sharing the Same Band," Microwave Journal, Year: 2020, pp. 1-5.

* cited by examiner

*Primary Examiner* — Asad M Nawaz
*Assistant Examiner* — Natali Pascual Peguero
(74) *Attorney, Agent, or Firm* — Patterson + Sheridan, LLP

(57) ABSTRACT

The present disclosure describes an access point with an adjustable scan radio and a method of operating the access point. The access point operates a scan radio to determine first and second sets of metrics for packets detected by the scan radio with a received signal strength indicator (RSSI) greater than first and second RSSI thresholds, respectively. The access point also operates a service radio to determine a third set of metrics for packets transmitted by the service radio and determines a first weight and a second weight based on the third set of metrics. The access point further applies the first and second weights to the first and second sets of metrics to produce first and second sets of weighted metrics and adjusts the service radio based on the first and second sets of weighted metrics.

20 Claims, 6 Drawing Sheets

ACCESS POINT WITH ADJUSTABLE SCAN RADIO

TECHNICAL FIELD

Embodiments presented in this disclosure generally relate to wireless communication. More specifically, embodiments disclosed herein relate to a network access point with an adjustable scan radio.

BACKGROUND

Access points provide access to wireless networks (e.g., wireless fidelity (WiFi) networks). The access points may include several radios that wirelessly transmit and receive messages from other devices in the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
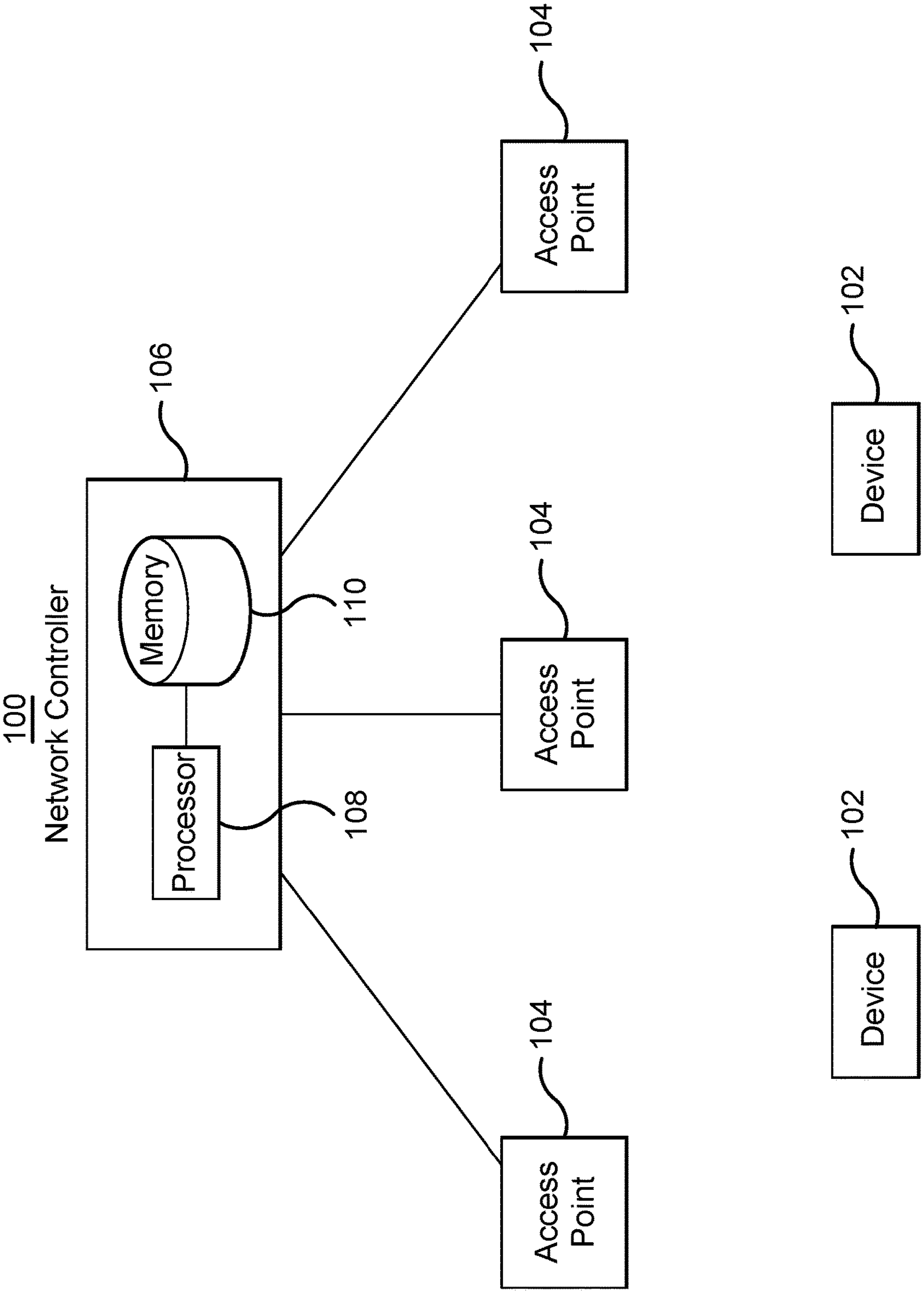
FIG. 1 illustrates an example system.

The present disclosure describes an access point with an adjustable scan radio and a method of operating the access point. According to an embodiment, an access point includes a service radio, a scan radio, a memory, and a processor communicatively coupled to the memory. The processor operates the scan radio using a first received signal strength indicator (RSSI) threshold to determine a first set of metrics for packets detected by the scan radio with an RSSI greater than the first RSSI threshold and operates the scan radio using a second RSSI threshold to determine a second set of metrics for packets detected by the scan radio with an RSSI greater than the second RSSI threshold. The first RSSI threshold is greater than the second RSSI threshold. The processor also operates the service radio to determine a third set of metrics for packets transmitted by the service radio and determines a first weight and a second weight based on the third set of metrics. The processor further applies the first weight to the first set of metrics to produce a first set of weighted metrics and applies the second weight to the second set of metrics to produce a second set of weighted metrics. The processor also adjusts the service radio based on the first set of weighted metrics and the second set of weighted metrics.

According to another embodiment, a method includes operating a scan radio of an access point using a first received signal strength indicator (RSSI) threshold to determine a first set of metrics for packets detected by the scan radio with an RSSI greater than the first RSSI threshold and operating the scan radio using a second RSSI threshold to determine a second set of metrics for packets detected by the scan radio with an RSSI greater than the second RSSI threshold. The first RSSI threshold is greater than the second RSSI threshold. The method also includes operating a service radio of the access point to determine a third set of metrics for packets transmitted by the service radio and determining a first weight and a second weight based on the third set of metrics. The method further includes applying the first weight to the first set of metrics to produce a first set of weighted metrics, applying the second weight to the second set of metrics to produce a second set of weighted metrics, and adjusting the service radio based on the first set of weighted metrics and the second set of weighted metrics.

According to another embodiment, a non-transitory computer readable medium stores instructions that, when executed by a processor, cause the processor to operate a scan radio of an access point to determine a first metric for packets detected by the scan radio with a received signal strength indicator (RSSI) greater than a first RSSI threshold and operate the scan radio to determine a second metric for packets detected by the scan radio with an RSSI greater than a second RSSI threshold. The first RSSI threshold is greater than the second RSSI threshold. The processor also operates a service radio of the access point to determine a first weight and a second weight based on packets transmitted by the service radio and applies the first weight to the first metric to produce a first weighted metric. The processor further applies the second weight to the second metric to produce a second weighted metric and adjusts the service radio based on the first weighted metric and the second weighted metric.

Example Embodiments

Access points provide wireless access to wireless fidelity (WiFi) networks. The access points may include several radios that wirelessly transmit and receive messages from other devices in the network. Some access points include service radios and a scan radio. The service radios transmit and receive data messages from the other devices in the network. The scan radio may be dedicated to scanning different channels to determine information about the channels. For example, the scan radio may scan the channels to determine the number of available networks per channel, the number of devices on a channel, and signal strength and distance for each device on a channel.

Because the service radios and scan radio in an access point are in close proximity to one another, the service radios may interfere with the operations of the scan radio. The interference may cause the scan radio to determine inaccurate or incorrect information about the channels. For example, the interference may cause the scan radio to determine that there is significant WiFi activity on a channel even when there is no activity on the channel. These inaccuracies may result in the access point making inefficient or incorrect connection and traffic decisions.

The present disclosure describes an access point that accounts for interference from service radios when analyzing information from the scan radio. The access point operates the scan radio in two different modes to collect information. In the first mode, the access point operates the scan radio and detects packets with a received signal strength indicator (RSSI) above a first RSSI threshold to produce a first set of metrics. In the second mode (which may be referred to as a desensitized mode), the access point operates the scan radio and detects packets with a RSSI above a higher, second RSSI threshold to produce a second set of metrics. The access point weights the first set of metrics and the second set of metrics based on operating metrics from the service radios. For example, if the service radios were very active when the scan radio was being operated, then the second set of metrics produced during the desensitized mode may be weighted more heavily than the first set of metrics. The access point may then adjust the service radios and/or the scan radio using the weighted metrics.

In certain embodiments, the access point provides several technical advantages. For example, the access point may account for interference from the service radios when analyzing information from the scan radio. By accounting for the interference, the access point may make more efficient and accurate adjustments to the service radios using the information from the scan radio. As another example, by accounting for the interference, the access point may be adjusted to communicate more packets successfully with connected devices.

FIG. 1 illustrates an example system 100. As seen in FIG. 1, the system 100 includes one or more devices 102, one or more access points 104, and a network controller 106. Generally, the access points 104 provide wireless network access for the devices 102. The network controller 106 may administer or control the access points 104. In some embodiments, the network controller 106 is embodied in one or more of the access points 104.

The device 102 (which may also be referred to as a client device) may connect to one or more access points 104 to receive network access. The device 102 may connect to different access points 104 as the device 102 moves throughout the system 100. For example, the device 102 may connect to the access point 104 that is physically closest to the device 102 as the device 102 moves throughout the system 100.

The device 102 is any suitable device for communicating with components of the system 100. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access points 104 facilitate wireless communication in the system 100. One or more devices 102 may connect to an access point 104. The access point 104 may then facilitate wireless communication for the connected devices 102. For example, the access point 104 may transmit messages to a connected device 102. As another example, the access point 104 may receive messages transmitted by the device 102. The access point 104 may then direct that message towards its intended destination.

The network controller 106 may control or administer other components of the system 100 (e.g., the access points 104). For example, the network controller 106 may instruct the access points 104 to communicate over particular channels or to use particular transmission powers. The network controller 106 may issue these instructions to reduce interference between the access points 104 and/or between radios in an access point 104. As seen in FIG. 1, the network controller 106 includes a processor 108 and a memory 110 that perform the functions or actions of the network controller 106 described herein.

The processor 108 is any electronic circuitry, including, but not limited to one or a combination of microprocessors, microcontrollers, application specific integrated circuits (ASIC), application specific instruction set processor (ASIP), and/or state machines, that communicatively couples to memory 110 and controls the operation of the network controller 106. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the network controller 106 by processing information (e.g., information received from the devices 102, access points 104, and memory 110). The processor 108 is not limited to a single processing device and may encompass multiple processing devices.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein.

Figure 2:
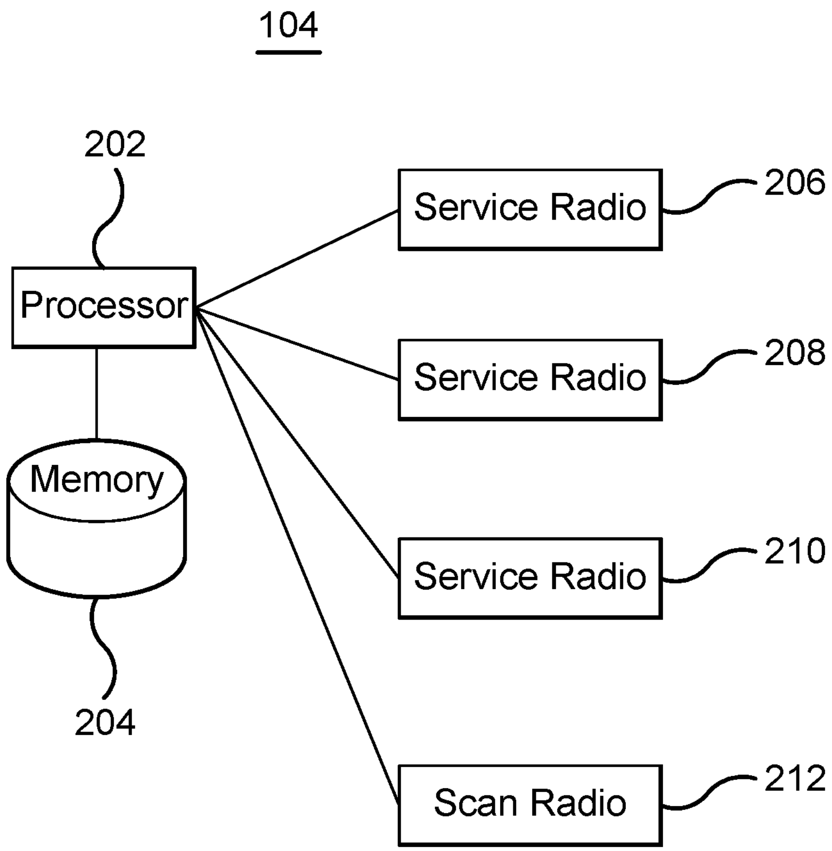
FIG. 2 illustrates an example access point in the system of FIG. 1.

FIG. 2 illustrates an example access point 104 in the system 100 of FIG. 1. As seen in FIG. 2, the access point 104 includes a processor 202, a memory 204, service radios 206, 208, and 210, and a scan radio 212. The processor 202 and the memory 204 may perform the functions or actions of the access point 104 described herein. Generally, the access point 104 operates the scan radio 212 in two different modes to gather information about different network channels. The access point 104 also tracks the messages transmitted and received by the service radios 206, 208, and 210 while operating the scan radio 212 in the two different modes. The access point 104 applies weights to the information gathered by the scan radio 212 based on the messages transmitted and received by the service radios 206, 208, and 210 to account for interference caused by the service radios 206, 208, and 210 on the scan radio 212. The access point 104 may then adjust the scan radio 212 based on this weighted information.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the access point 104. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the access point 104 by processing information (e.g., information received from the devices 102, network controller 106, and memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The access point 104 may include any number of service radios. In the example of FIG. 2, the access point 104 includes the service radios 206, 208, and 210. These service radios 206, 208, and 210 may transmit and receive messages from devices 102 connected to the access point 104. Each of the service radios 206, 208, and 210 may operate in a different band. For example, the service radio 206 may communicate using the 2 GHz band, the service radio 208 may communicate using the 5 GHz band, and the service radio 210 may communicate using the 6 GHz band. The service radios 206, 208, and 210 may also communicate using various channels in their respective bands. The access point 104 may instruct the service radios 206, 208, and 210 to use particular channels to avoid interference from other access points 104 or devices 102.

The access point 104 uses the scan radio 212 to scan through channels and listen for packets being communicated in these channels. The access point 104 may set a received signal strength indicator (RSSI) threshold. If the RSSI value for a signal received by the scan radio 212 exceeds the RSSI threshold, then the scan radio 212 may determine the signal is a packet and demodulate or decode the packet. If the RSSI value for a signal received by the scan radio 212 does not exceed the RSSI threshold, then the scan radio 212 may treat the signal as noise and disregard the signal.

The access point 104 may determine and track certain metrics for the packets detected or decoded by the scan radio 212. For example, the access point 104 may determine and track the number of packets detected or decoded by the access point 104. As another example, the access point 104 may determine and track the number of clock cycles or an amount of time spent detecting or decoding packets. Using these metrics, the access point 104 may determine an amount of network activity in the channels scanned by the scan radio 212. For example, the access point 104 may determine the utilization of certain channels. The access point 104 may adjust the service radios 206, 208, and 210 using this information from the scan radio 212. For example, the access point 104 may steer the service radios 206, 208, and 210 towards channels that are not heavily utilized to improve network communications.

Transmissions from the service radios 206, 208, and 210, however, may interfere with the operations of the scan radio 212. Specifically, due to the proximity of the service radios 206, 208, and 210 to the scan radio 212, it may be prohibitively difficult to isolate the scan radio 212 from the service radios 206, 208, and 210, and so transmissions from the service radios 206, 208, and 210 may bombard and interfere with the scan radio 212. This interference may cause the information gathered by the scan radio 212 to contain inaccuracies. For example, the scan radio 212 may interpret the interference from the service radios 206, 208, and 210 as packets in a particular channel. As a result, the access point 104 may determine that the scan radio 212 decoded or detected many more packets in the channel than there actually were, which may result in the access point 104 incorrectly determining that the channel is more heavily utilized than it actually is. The access point 104 may then steer the service radios 206, 208, and 210 away from this channel and towards another channel that is actually more heavily utilized, which may not degrade network communications.

The access point 104 performs a process to account for the interference from the service radios 206, 208, and 210. The access point 104 operates the scan radio 212 in two different modes, which may be referred to as a normal mode and a desensitized mode. During the normal mode, the access point 104 operates the scan radio 212 using a normal RSSI threshold. The scan radio 212 treats signals with RSSI values that exceed the normal RSSI threshold as packets. Signals with RSSI values that do not exceed the normal RSSI threshold are disregarded.

The access point 104 determines a set of metrics for the normal mode. For example, the access point 104 may determine the number of packets decoded or detected by the scan radio 212 during the normal mode. As another example, the access point 104 may determine the number of clock cycles or an amount of time that the scan radio spent decoding or detecting packets during the normal mode.

During the desensitized mode, the access point 104 operates the scan radio 212 using a desensitized RSSI threshold, which is greater than the normal RSSI threshold. The scan radio 212 treats signals with RSSI values that exceed the desensitized RSSI threshold as packets. Signals with RSSI values that do not exceed the desensitized RSSI threshold are disregarded. Because the desensitized RSSI threshold is greater than the normal RSSI threshold, the scan radio 212 may disregard more signals than in the normal mode.

The access point 104 determines a set of metrics for the desensitized mode. For example, the access point 104 may determine the number of packets decoded or detected by the scan radio 212 during the desensitized mode. As another example, the access point 104 may determine the number of clock cycles or an amount of time that the scan radio spent decoding or detecting packets during the desensitized mode.

The access point 104 may determine a set of metrics for the service radios 206, 208, and 210. These metrics may indicate the transmit activity of the service radios 206, 208, and 210 during the normal mode and the desensitized mode. For example, the access point 104 may determine the number of packets or messages transmitted by the service radios 206, 208, and 210 during the normal mode and the desensitized mode. As another example, the access point 104 may determine the amount of time the service radios 206, 208, and 210 spent transmitting during the normal mode and the desensitized mode.

The access point 104 then weights the set of metrics for the normal mode and the set of metrics for the desensitized mode based on the transmit activity of the service radios 206, 208, and 210. For example, the access point 104 may determine a weight for the normal mode and a weight for the desensitized mode based on how much transmit activity from the service radios 206, 208, and 210 occurred during the normal mode and desensitized mode. Generally, the more transmit activity that there was, the more the access point 104 will weight the set of metrics for the desensitized mode relative to the set of metrics for the normal mode. Stated differently, the more transmit activity that there was from the service radios 206, 208, and 210, the larger the weight for the metrics for the desensitized mode and the smaller the weight for the set of metrics for the normal mode. The less transmit activity that there was from the service radios 206, 208, and 210, the smaller the weight for the metrics for the desensitized mode and the larger the weight for the set of metrics for the normal mode.

By weighting the set of metrics for the desensitized mode more heavily when there is more transmit activity from the service radios 206, 208, and 210, the access point 104 may account for interference caused by the service radios 206, 208, and 210 on the scan radio 212. Because the scan radio 212 is more likely to disregard the interference from the service radios 206, 208, and 210 during the desensitized mode relative to the normal mode, weighting the set of metrics for the desensitized mode more heavily may produce a more accurate determination of channel utilization.

In some embodiments, the access point 104 may apply the weights to the durations of the normal mode and the desensitized mode. For example, if there is a lot of transmit activity from the service radios 206, 208, and 210, then the access point 104 may apply weights that shorten the duration of the normal mode and that extend the duration of the desensitized mode. If there is little transmit activity from the service radios 206, 208, and 210, then the access point 104 may apply weights that extend the duration of the normal mode and that shorten the duration of the desensitized mode. By adjusting the durations of the modes, the access point 104 may increase or decrease the amount of information gathered during each mode, which may increase or decrease the impact each mode has on the determination of channel utilization.

The access point 104 may then adjust one or more of the service radios 206, 208, and 210 based on the weighted sets of metrics for the normal mode and the desensitized mode. For example, the access point 104 may determine channel utilization using both sets of weighted metrics and then steer one or more of the service radios 206, 208, and 210 towards less utilized channels. In this manner, the access point 104 improves network communication.

In some embodiments, the access point 104 may communicate the sets of weighted metrics to the network controller 106. The network controller 106 may analyze the sets of weighted metrics to determine channel utilization. The network controller 106 may then issue an instruction to the access point 104, and the access point 104 may steer the service radios 206, 208, and 210 to less utilized channels based on the instruction.

Figure 3:
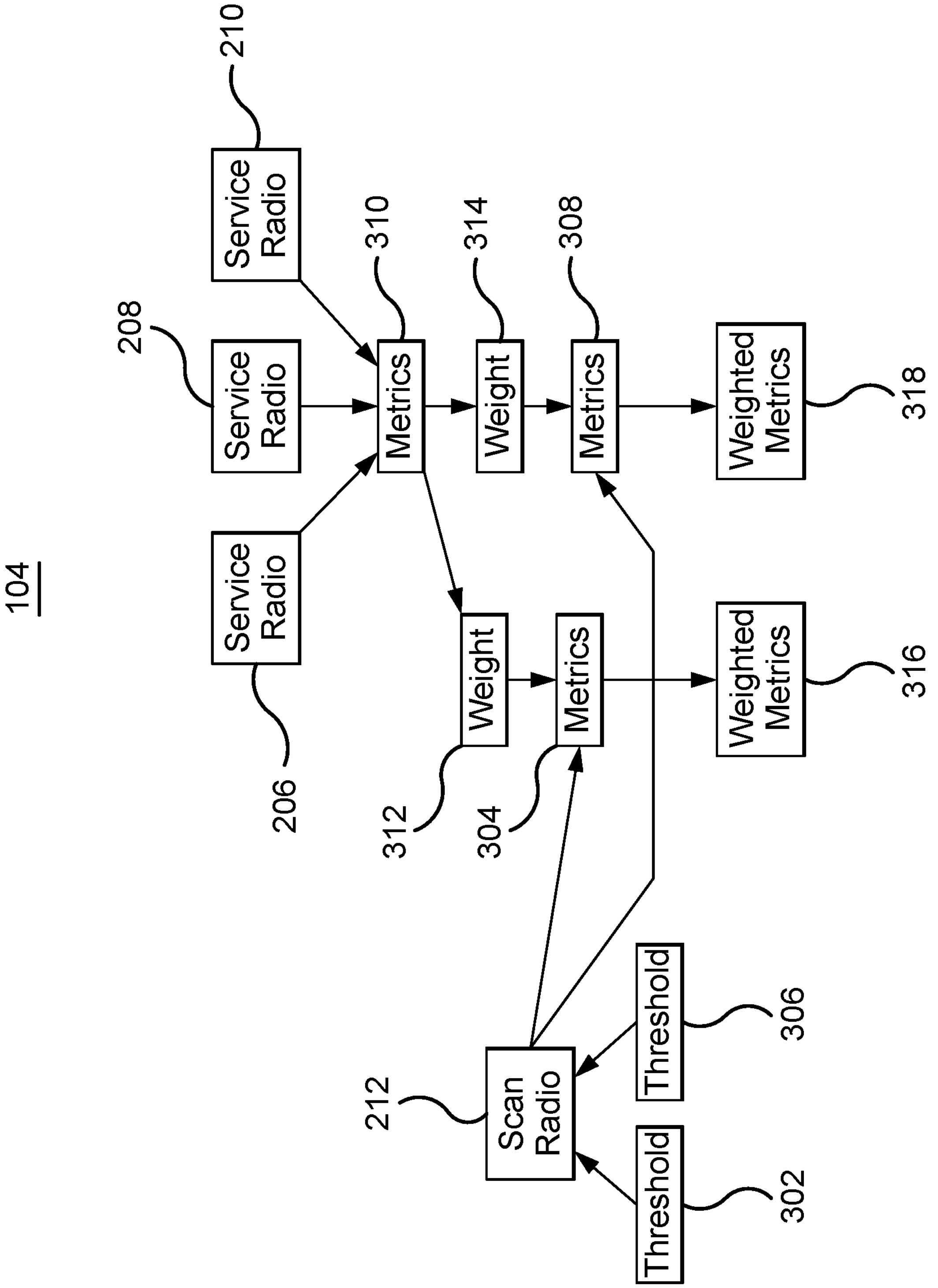
FIG. 3 illustrates an example access point in the system of FIG. 1.

FIG. 3 illustrates an example access point 104 in the system 100 of FIG. 1. As seen in FIG. 3, the access point 104 operates the scan radio 212 during the normal mode according to a threshold 302. If a signal received by the scan radio 212 has a RSSI value that exceeds the threshold 302, then the scan radio 212 treats the signal as a packet and decodes or detects the packet. If a signal received by the scan radio 212 has a RSSI value that does not exceed the threshold 302, then the scan radio 212 disregards the signal.

The access point 104 determines or gathers metrics 304 during the normal mode. For example, the access point 104 may determine a number of packets decoded or detected by the scan radio 212 during the normal mode. As another example, the access point 104 may determine a number of clock cycles or an amount of time that the scan radio 212 spent decoding or detecting packets during the normal mode.

The access point 104 may operate the scan radio 212 during the desensitized mode according to a threshold 306. If a signal received by the scan radio 212 has a RSSI value that exceeds the threshold 306, then the scan radio 212 treats the signal as a packet and decodes or detects the packet. If a signal received by the scan radio 212 has a RSSI value that does not exceed the threshold 302, then the scan radio 212 disregards the signal.

The access point 104 determines or gathers metrics 308 during the desensitized mode. For example, the access point 104 may determine a number of packets decoded or detected by the scan radio 212 during the desensitized mode. As another example, the access point 104 may determine a number of clock cycles or an amount of time that the scan radio 212 spent decoding or detecting packets during the desensitized mode.

The access point 104 also determines transmit activity of the service radios 206, 208, and 210 (e.g., during the normal mode and the desensitized mode). The access point 104 may determine metrics 310 for the service radios 206, 208, and 210. The metrics 310 may indicate the transmit activity of the service radios 206, 208, and 210. For example, the metrics 310 may include the number of messages transmitted by the service radios 206, 208, and 210. As another example, the metrics 310 may include the transmission powers used by the service radios 206, 208, and 210. As another example, the metrics 310 may include the channels used by the service radios 206, 208, and 210 to transmit.

The access point 104 determines weights 312 and 314 based on the metrics 310. The weight 312 may be for the metrics 304, and the weight 314 may be for the metrics 308. The more transmit activity indicated by the metrics 310, the larger the weight 314 is relative to the weight 312. The less transmit activity indicated by the metrics 310, the smaller the weight 314 is relative to the weight 312. In this manner, the access point 104 weights the metrics 308 (from the desensitized mode) more heavily than the metrics 304 (from the normal mode) when there is more transmit activity from the service radios 206, 208, and 210. The access point 104 applies the weight 312 to the metrics 304 to produce weighted metrics 316. The access point 104 applies the weight 314 to the metrics 308 to produce weighted metrics 318.

Figure 4:
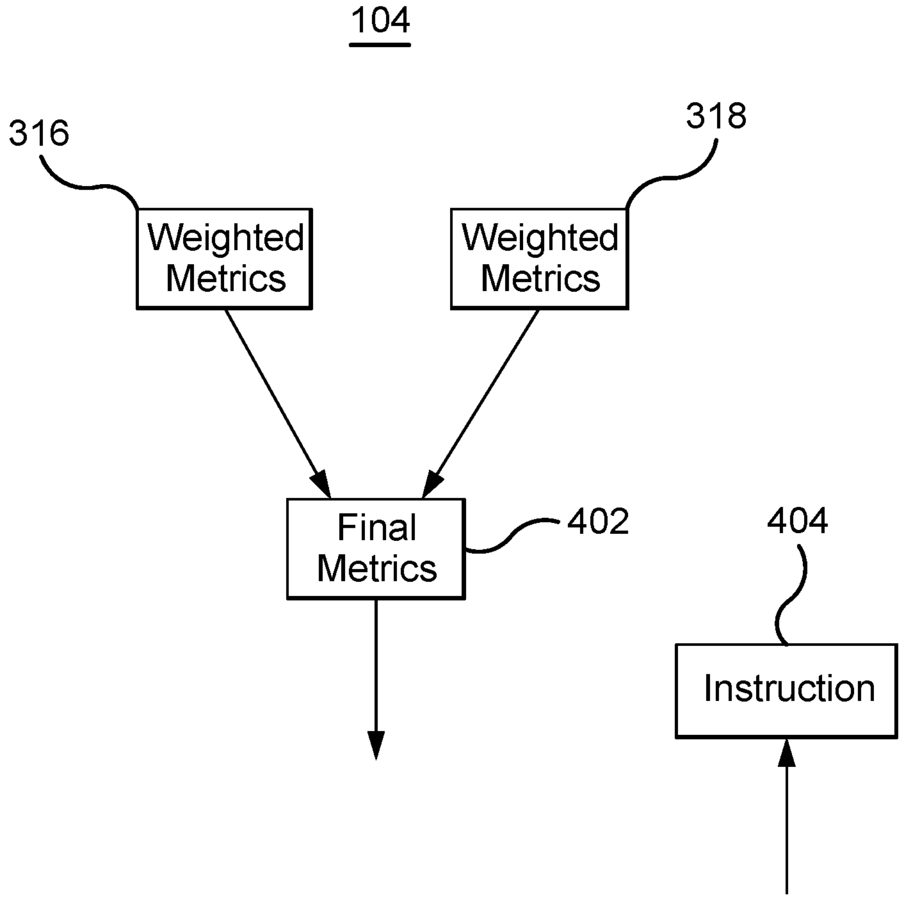
FIG. 4 illustrates an example access point in the system of FIG. 1.

The access point 104 may then adjust the service radios 206, 208, and 210 or the scan radio 212 using the weighted metrics 316 and 318. FIG. 4 illustrates an example access point 104 in the system 100 of FIG. 1 using the network controller 106 to determine the adjustment. As seen in FIG. 4, the access point 104 combines the weighted metrics 316 and 318 into a set of final metrics 402. The access point 104 may produce the final metrics 402 in any suitable manner. For example, the access point 104 may merely combine the weighted metrics 316 and 318 into one set to form the final metrics 402. In other words, the final metrics 402 would include both the weighted metrics 316 and the weighted metrics 318. As another example, the access point 104 may average the weighted metrics 316 and weighted metrics 318 to form the final metrics 402.

The access point 104 may then communicate the final metrics 402 to the network controller 106 for evaluation. The network controller 106 may use the final metrics 402 to determine the channel utilization in the system 100. For example, the network controller 106 may determine which channels are lightly utilized and which channels are heavily utilized. The network controller 106 may then communicate an instruction 404 to the access point 104. The instruction 404 may include adjustments to the service radios 206, 208, and 210. For example, the instruction 404 may include channels that the service radios 206, 208, and 210 should use to communicate. In this manner, the network controller 106 may steer the service radios 206, 208, and 210 from heavily utilized channels to lightly utilized channels, which may improve network communications. In some embodiments, steering the service radios 206, 208, and 210 to other channels may also reduce the interference caused by the service radios 206, 208, and 210. As another example, the instruction 404 may include transmission powers that the service radios 206, 208, and 210 should use to communicate. In this manner, the network controller 106 may adjust the transmission powers of the service radios 206, 208, and 210 to reduce interference caused by the service radios 206, 208, and 210.

Figure 5:
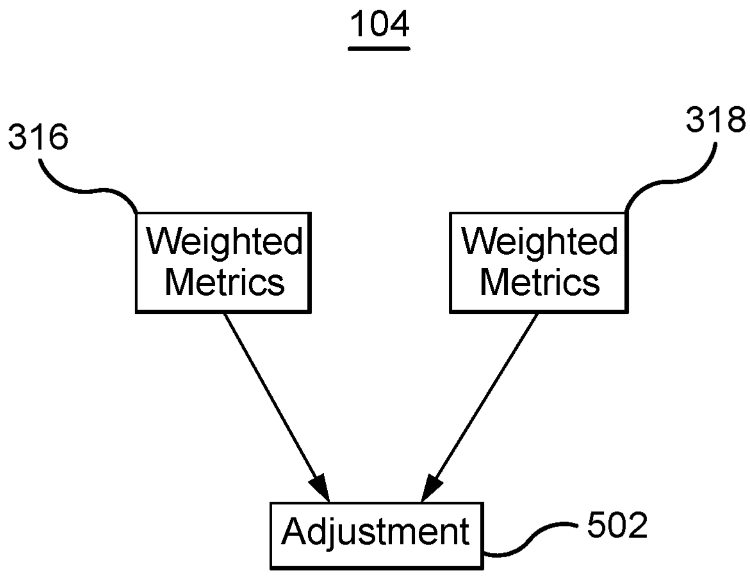
FIG. 5 illustrates an example access point in the system of FIG. 1.

FIG. 5 illustrates an example access point 104 in the system 100 of FIG. 1 determining the adjustment. As seen in FIG. 5, the access point 104 analyzes the weighted metrics 316 and 318 to determine channel utilization. For example, the access point 104 may determine from the weighted metrics 316 and 318 the channels that are lightly utilized and the channels that are heavily utilized. The access point 104 may then determine an adjustment 502 using the channel utilization. The adjustment 502 may include adjustments to which channels the service radios 206, 208, and 210 use to transmit. The adjustment 502 may include adjustments to the transmission powers of the service radios 206, 208, and 210. The access point 104 may make the adjustment 502 to the service radios 206, 208, and 210, which may improve network communications and/or reduce interference caused by the service radios 206, 208, and 210.

In some embodiments, the instruction 404 and the adjustment 502 may include an adjustment to the scan radio 212. For example, the access point 104 may change how frequently or for how long the scan radio 212 scans particular channels. As another example, the access point 104 may change the thresholds 302 and 306 that the scan radio 212 uses during the normal mode and the desensitized mode.

Figure 6:
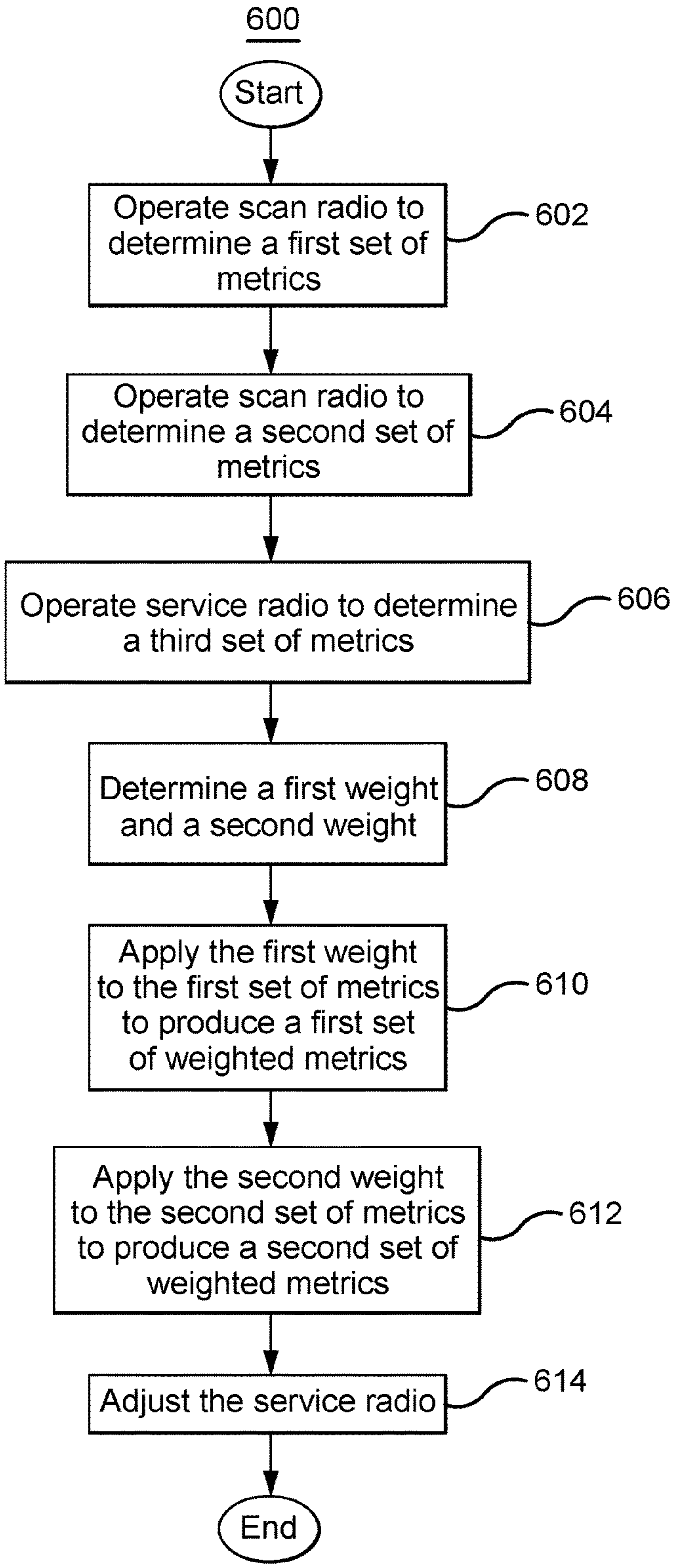
FIG. 6 is a flowchart of an example method performed in the system of FIG. 1.

FIG. 6 is a flowchart of an example method 600 performed in the system 100 of FIG. 1. In particular embodiments, the access point 104 performs the method 600. By performing the method 600, the access point 104 accounts for interference caused by service radios 206, 208, and 210 on the scan radio 212 in the access point 104. As a result, the access point 104 improves the accuracy of information gathered from the scanning operations of the scan radio 212, in certain embodiments.

In block 602, the access point 104 operates the scan radio 212 (e.g., during a normal mode) to determine a first set of metrics 304. The access point 104 may operate the scan radio 212 during the normal mode according to the threshold 302. If a signal received by the scan radio 212 has a RSSI value greater than the threshold 302, then the scan radio 212 treats the signal as a packet and decodes or detects the packet. If a signal received by the scan radio 212 has a RSSI value that does not exceed the threshold 302, then the scan radio 212 disregards the signal. The metrics 304 may include any information concerning the packets decoded or detected by the scan radio 212. For example, the metrics 304 may include the number of packets decoded or detected by the scan radio 212. As another example, the metrics 304 may include the number of clock cycles or an amount of time spent by the scan radio 212 decoding or detecting packets.

In block 604, the access point 104 operates the scan radio 212 (e.g., during a desensitized mode) to determine a second set of metrics 308. The access point 104 may operate the scan radio 212 during the desensitized mode according to the threshold 306. The threshold 306 may be greater than the threshold 302. If a signal received by the scan radio 212 has a RSSI value greater than the threshold 306, then the scan radio 212 treats the signal as a packet and decodes or detects the packet. If a signal received by the scan radio 212 has a RSSI value that does not exceed the threshold 306, then the scan radio 212 disregards the signal. The metrics 308 may include any information concerning the packets decoded or detected by the scan radio 212. For example, the metrics 308 may include the number of packets decoded or detected by the scan radio 212. As another example, the metrics 308 may include the number of clock cycles or an amount of time spent by the scan radio 212 decoding or detecting packets.

In block 606, the access point 104 operates a service radio 206, 208, or 210 to determine a third set of metrics 310. The access point 104 may operate the service radio 206, 208, or 210 to transmit signals during the normal mode and the desensitized mode. These transmissions may interfere with the operations of the scan radio 212. The metrics 310 may include any information concerning the transmission made by the service radio 206, 208, or 210. For example, the metrics 310 may include the number of messages transmitted by the service radio 206, 208, or 210. As another example, the metrics 310 may include the transmission powers used by the service radio 206, 208, or 210. As another example, the metrics 310 may include the channels used by the service radio 206, 208, or 210 to transmit.

In block 608, the access point 104 determines a first weight 312 and a second weight 314 based on the metrics 310. The weight 312 may be for the metrics 304 from the normal mode, and the weight 314 may be for the metrics 308 from the desensitized mode. The more transmission activity indicated by the metrics 310, the larger the weight 314 is relative to the weight 312. The less transmission activity indicated by the metrics 310, the smaller the weight 314 is relative to the weight 312. By setting the weights 312 and 314 in this manner, the access point 104 may weigh the metrics 308 from the desensitized mode more heavily than the metrics 304 from the normal mode the more transmission activity there is. Because the scan radio 212 is less likely to treat interference from the service radio 206, 208, or 210 as packets during the desensitized mode, the metrics 308 may be a more accurate indication of channel utilization. Thus, by weighing the metrics 308 more heavily compared to the metrics 304, the access point 104 may improve the accuracy of the information gathered by the scan radio 212.

In block 610, the access point 104 applies the weight 312 to the metrics 304 to produce the weighted metrics 316. In block 612, the access point 104 applies the weight 314 to the metrics 308 to produce the weighted metrics 318. In block 614, the access point 104 adjusts the service radio 206, 208, or 210. For example, the access point 104 may steer the service radio 206, 208, or 210 from highly utilized channels to less utilized channels. As another example, the access point may reduce the transmission power of the service radio 206, 208, or 210 to reduce interference caused by the service radio 206, 208, or 210.

In some embodiments, the network controller 106 determines the adjustment to be made to the service radio 206, 208, or 210. The access point 104 may communicate the weighted metrics 316 and 318 to the network controller 106, and the network controller 106 may determine channel utilization from the weighted metrics 316 and 318. The network controller 106 then communicates an instruction 404 to the access point 104 indicating the adjustment. In certain embodiments, the access point 104 determines the channel utilization from the weighted metrics 316 and 318. The access point 104 then determines the adjustment 502 to be made to the service radio 206, 208, or 210.

In summary, the access point 104 accounts for interference from service radios 206, 208, and 210 when analyzing information from the scan radio 212. The access point 104 operates the scan radio 212 in two different modes to collect information. In the first mode, the access point 104 operates the scan radio 212 and detects packets with a received signal strength indicator (RSSI) above a first RSSI threshold 302 to produce a first set of metrics 304. In the second mode (which may be referred to as a desensitized mode), the access point 104 operates the scan radio 212 and detects packets with a RSSI above a higher, second RSSI threshold 306 to produce a second set of metrics 308. The access point 104 weights the first set of metrics 304 and the second set of metrics 308 based on operating metrics 310 from the service radios 206, 208, and 210. For example, if the service radios 206, 208, and 210 were very active when the scan radio 212 was being operated, then the second set of metrics 308 produced during the desensitized mode may be weighted more heavily than the first set of metrics 304. The access point 104 may then adjust the service radios 206, 208, and 210 and/or the scan radio 212 using the weighted metrics.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point comprising:
- a service radio;
- a scan radio;
- a memory; and
- a processor communicatively coupled to the memory, the processor configured to:
  - operate, during a first mode, the scan radio using a first received signal strength indicator (RSSI) threshold to determine a first set of metrics for packets detected by the scan radio with an RSSI greater than the first RSSI threshold;
  - operate, during a second mode, the scan radio using a second RSSI threshold to determine a second set of metrics for packets detected by the scan radio with an RSSI greater than the second RSSI threshold, wherein the first RSSI threshold is greater than the second RSSI threshold;
  - operate the service radio to determine a third set of metrics for packets transmitted by the service radio during the first mode and the second mode;
  - determine a first weight and a second weight based on the third set of metrics, wherein the first weight relates to an amount of interference caused by the service radio to the scan radio during the first mode, and wherein the second weight relates to an amount of interference caused by the service radio to the scan radio during the second mode;
  - apply the first weight to the first set of metrics to produce a first set of weighted metrics;
  - apply the second weight to the second set of metrics to produce a second set of weighted metrics; and
  - adjust the service radio based on the first set of weighted metrics and the second set of weighted metrics.

2. The access point of claim 1, wherein the processor is further configured to combine the first set of weighted metrics and the second set of weighted metrics to produce a final set of metrics for the scan radio.

3. The access point of claim 2, wherein adjusting the service radio comprises:
- communicating the final set of metrics to a network controller;
- receiving an instruction from the network controller; and
- adjusting the service radio according to the instruction.

4. The access point of claim 1, wherein the first set of metrics comprises at least one of a number of packets decoded by the scan radio or a number of clock cycles during which the scan radio detected a packet.

5. The access point of claim 1, wherein the third set of metrics comprises at least one of a transmission power or a channel over which the service radio transmitted.

6. The access point of claim 1, wherein the more packets transmitted by the service radio, the greater the first weight relative to the second weight.

7. The access point of claim 1, wherein the processor is further configured to adjust the scan radio based on the first set of weighted metrics and the second set of weighted metrics.

8. A method comprising:
- operating, during a first mode, a scan radio of an access point using a first received signal strength indicator (RSSI) threshold to determine a first set of metrics for packets detected by the scan radio with an RSSI greater than the first RSSI threshold;
- operating, during a second mode, the scan radio using a second RSSI threshold to determine a second set of metrics for packets detected by the scan radio with an RSSI greater than the second RSSI threshold, wherein the first RSSI threshold is greater than the second RSSI threshold;
- operating a service radio of the access point to determine a third set of metrics for packets transmitted by the service radio during the first mode and the second mode;
- determining a first weight and a second weight based on the third set of metrics, wherein the first weight relates to an amount of interference caused by the service radio to the scan radio during the first mode, and wherein the second weight relates to an amount of interference caused by the service radio to the scan radio during the second mode;
- applying the first weight to the first set of metrics to produce a first set of weighted metrics;
- applying the second weight to the second set of metrics to produce a second set of weighted metrics; and
- adjusting the service radio based on the first set of weighted metrics and the second set of weighted metrics.

9. The method of claim 8, further comprising combining the first set of weighted metrics and the second set of weighted metrics to produce a final set of metrics for the scan radio.

10. The method of claim 9, wherein adjusting the service radio comprises:
- communicating the final set of metrics to a network controller;
- receiving an instruction from the network controller; and
- adjusting the service radio according to the instruction.

11. The method of claim 8, wherein the first set of metrics comprises at least one of a number of packets decoded by the scan radio or a number of clock cycles during which the scan radio detected a packet.

12. The method of claim 8, wherein the third set of metrics comprises at least one of a transmission power or a channel over which the service radio transmitted.

13. The method of claim 8, wherein the more packets transmitted by the service radio, the greater the first weight relative to the second weight.

14. The method of claim 8, further comprising adjusting the scan radio based on the first set of weighted metrics and the second set of weighted metrics.

15. A non-transitory computer readable medium storing instructions that, when executed by a processor, cause the processor to:

operate, during a first mode, a scan radio of an access point to determine a first metric for packets detected by the scan radio with a received signal strength indicator (RSSI) greater than a first RSSI threshold;

operate, during a second mode, the scan radio to determine a second metric for packets detected by the scan radio with an RSSI greater than a second RSSI threshold, wherein the first RSSI threshold is greater than the second RSSI threshold;

operate a service radio of the access point to determine a first weight and a second weight based on packets transmitted by the service radio during the first mode and the second mode, wherein the first weight relates to an amount of interference caused by the service radio to the scan radio during the first mode, and wherein the second weight relates to an amount of interference caused by the service radio to the scan radio during the second mode;

apply the first weight to the first metric to produce a first weighted metric;

apply the second weight to the second metric to produce a second weighted metric; and adjust the service radio based on the first weighted metric and the second weighted metric.

16. The medium of claim 15, wherein the processor further combines the first weighted metric and the second weighted metric to produce a final metric for the scan radio.

17. The medium of claim 16, wherein adjusting the service radio comprises:

communicating the final metric to a network controller;

receiving an instruction from the network controller; and adjusting the service radio according to the instruction.

18. The medium of claim 15, wherein the first metric comprises at least one of a number of packets decoded by the scan radio or a number of clock cycles during which the scan radio detected a packet.

19. The medium of claim 15, wherein the more packets transmitted by the service radio, the greater the first weight relative to the second weight.

20. The medium of claim 15, wherein the processor further adjusts the scan radio based on the first weighted metric and the second weighted metric.

* * * * *